(12) United States Patent
Esswie

(10) Patent No.: US 12,439,442 B2
(45) Date of Patent: Oct. 7, 2025

(54) PREEMPTION AND ALLOCATION OF A CONTROL CHANNEL RESOURCE IN A RADIO ACCESS NETWORK

(71) Applicant: Dell Products, L.P., Round Rock, TX (US)

(72) Inventor: Ali Esswie, Montreal (CA)

(73) Assignee: Dell Products L.P., Round Rock, TX (US)

( * ) Notice: Subject to any disclaimer, the term of this patent is extended or adjusted under 35 U.S.C. 154(b) by 549 days.

(21) Appl. No.: 17/866,233

(22) Filed: Jul. 15, 2022

(65) Prior Publication Data

US 2024/0023152 A1    Jan. 18, 2024

(51) Int. Cl.
*H04W 72/20*  (2023.01)
*H04W 72/542*  (2023.01)
*H04W 72/56*  (2023.01)

(52) U.S. Cl.
CPC ......... *H04W 72/542* (2023.01); *H04W 72/20* (2023.01); *H04W 72/56* (2023.01)

(58) Field of Classification Search
CPC ... H04W 72/542; H04W 72/20; H04W 72/56; H04W 72/543; H04W 72/23; H04L 5/0064; H04L 5/001; H04L 5/0048; H04L 5/0053
USPC .......................................................... 370/329
See application file for complete search history.

(56) References Cited

U.S. PATENT DOCUMENTS

| | | | |
|---|---|---|---|
| 2021/0160828 A1* | 5/2021 | Taherzadeh Boroujeni | ................ H04W 64/003 |
| 2021/0377917 A1* | 12/2021 | Xu | ............................ H04L 1/08 |
| 2023/0156572 A1* | 5/2023 | Reial | ................. H04W 52/0229 370/329 |
| 2023/0232407 A1* | 7/2023 | Yuan | ..................... H04L 1/0038 370/329 |
| 2023/0354164 A1* | 11/2023 | Li | .......................... H04W 48/12 |
| 2023/0354471 A1* | 11/2023 | Li | ....................... H04W 52/028 |

OTHER PUBLICATIONS

Technical specifications (TS) 38.201 "5G; NR; Physical layer; General description", 3GPP TS 38.201 version 15.0.0 Release 15, Sep. 2018, 14 pages.

(Continued)

*Primary Examiner* — Ayman A Abaza
*Assistant Examiner* — Abdul Aziz Santarisi
(74) *Attorney, Agent, or Firm* — Amin, Turocy & Watson, LLP

(57) ABSTRACT

A control channel search space granted by a RAN node to a first UE processing packets of a latency-tolerant traffic flow is configured as a preemption candidate search space. A second UE processing a less-latency-tolerant traffic flow may be granted the preemption candidate to facilitate delivery of control information. The RAN may configure the UEs with a preemption search space that may provide preemption configuration or preemption notification information that facilitates the second UE searching the preemption candidate and may notify the first UE that the preemption candidate previously granted thereto has been granted to the second UE. The first UE may sleep during a configured preemption validity period or until a next DRX cycle search opportunity. The RAN may dynamically configure the first UE with a complementary search space when the RAN determines that the second UE needs to use the preemption candidate search space.

20 Claims, 15 Drawing Sheets

(56) References Cited

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304 "5G; NR; User Equipment (UE) procedures in idle mode and in RRC Inactive state", 3GPP TS 38.304 version 16.1.0 Release 16, Jul. 2020, 41 pages.
Technical specifications (TS) 38.300 "5G; NR; NR and NG-RAN Overall description; Stage-2" 3GPP TS 38.300 version 16.4.0 Release 16, Jan. 2021, 151 pages.

* cited by examiner

| Preempted UE - specific search space ID and/or index | Preempting UE ID (TMSI, C - RNTI) | Preemption validity period (in ms or number of preempted search space instances) |
|---|---|---|
| Xxx_1 | Yyy_1 | Zz_1 |
| .. | .. | .. |
| .. | .. | .. |
| Xxx_n | Yyy_n | Zz_n |

| Preempted UE specific search space ID and/or index | Preempting UE ID (TMSI, C-RNTI) | Preemption validity period (in ms or number of preempted search space instances) | Complementary search space information for preempted UE |
|---|---|---|---|
| Xxx_1 | Yyy_1 | Zz_1 | NULL |
| .. | .. | .. | .. |
| .. | .. | .. | .. |
| Xxx_n | Yyy_n | Zz_n | Cc_n and/or search space explicit information |

PREEMPTION AND ALLOCATION OF A CONTROL CHANNEL RESOURCE IN A RADIO ACCESS NETWORK

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method comprises, determining, by a radio access network node comprising a processor, to grant a data channel resource to a second user equipment based on a second priority corresponding to a second quality-of-service associated with a second user equipment being determined to be higher than a first priority corresponding to a first quality-of-service associated with a first user equipment, and transmitting, in a first control channel search space preemption candidate, scheduling information corresponding to the grant of the data channel resource to the second user equipment. A control channel search space preemption candidate may be referred to as simply a preemption candidate. A preemption candidate may be decoded by a device-specific scrambling code or sequence, or by a scrambling code or sequence corresponding to a plurality of user equipment devices.

The example may further comprise configuring the first user equipment to monitor the first control channel search space preemption candidate according to a first scrambling code corresponding to the first user equipment; configuring the second user equipment to monitor the first control channel search space preemption candidate according to a second scrambling code corresponding to the second user equipment; and scrambling the control channel search space according to the second scrambling code; wherein the first control channel search space preemption candidate is associated with the first user equipment. In such a scenario, the first user equipment may not have been notified that the first preemption candidate has been reallocated to, or granted to, the second user equipment, in which case the first user equipment may attempt to decode the first preemption candidate according to its previous configuration and fail in such decoding attempt. The configuring of the first user equipment or the second user equipment may be performed by information received from the RAN or according to information included in a device specific search space, such as a search space that the RAN configured the second user equipment to decode using a scrambling code or sequence specific to the second user equipment.

The example method may further comprise configuring, with preemption information retrieved from a preemption search space, the second user equipment to monitor the first control channel search space preemption candidate according to a second scrambling code corresponding to the second user equipment wherein the first user equipment is configured to monitor the first control channel search space preemption candidate according to a first scrambling code; and configuring the first user equipment and the second user equipment to monitor the control channel preemption search space. The control channel preemption search space may comprise a first preemption indication of the first control channel search space preemption candidate and the control channel preemption search space may comprise preemption notification information, which may be part of the preemption information that may be contained in the preemption search space. In an embodiment, the preemption notification information may comprise information indicating that the first control channel search space candidate has been granted to the second user equipment. Such notification information may facilitate the first user equipment in either sleeping until a preemption validity period has run/expired, or at least facilitate the first user equipment in not attempting to decode the preemption candidate that was previously granted thereto, since such an attempt would fail because the preemption candidate has been granted to the second user equipment and the first user equipment has not been configured with the second scrambling code or sequence.

In an embodiment, the preemption information, which may be referred to a preemption configuration information, may comprise one or more of: an identifier of the first user equipment, an identifier of the second user equipment, a preemption validity period during which the first control channel search space preemption candidate is available for monitoring, timing and frequency resource information corresponding to the first control channel search space preemption candidate, a bandwidth portion identifier corresponding to the first control channel search space preemption candidate, a bandwidth index corresponding to the first control channel search space preemption candidate, a search space identifier corresponding to the first control channel search space preemption candidate, a search space index corresponding to the first control channel search space preemption candidate, an aggregation level, a modulation scheme corresponding to the first control channel search space preemption candidate, a coding scheme corresponding to the first control channel search space preemption candidate, the first scrambling code corresponding to the first control channel search space preemption candidate, or a scrambling sequence corresponding to the first control channel search space preemption candidate. Such information may be used to instruct the second UE regarding monitoring and decoding the preemption candidate. Such information may also comprise preemption notification information that the provide information useful by the first UE in determining not to attempt to decode the preemption candidate.

In an embodiment, the method may further comprise configuring the first user equipment to monitor the first control channel search space preemption candidate after a defined preemption validity period that begins in association with the configuring of the second user equipment to monitor the first control channel search space preemption candidate according to the second scrambling code.

In an embodiment, the control channel preemption search space, or simply the preemption search space, may comprise complementary configuration information to configure the first user equipment to use a complementary control channel search space opportunity that occurs before an occurrence of a next first-user-equipment-specific control channel search space opportunity corresponding to a configured connected discontinuous reception cycle of the first user equipment.

The second user equipment may be configured in an embodiment to monitor a third control channel search space according to a second scrambling code.

BRIEF DESCRIPTION OF THE DRAWINGS

FIG. 5B illustrates example preemption notification information.

FIG. 7B illustrates complementary search space configuration information.

DETAILED DESCRIPTION OF THE DRAWINGS

Figure 1:
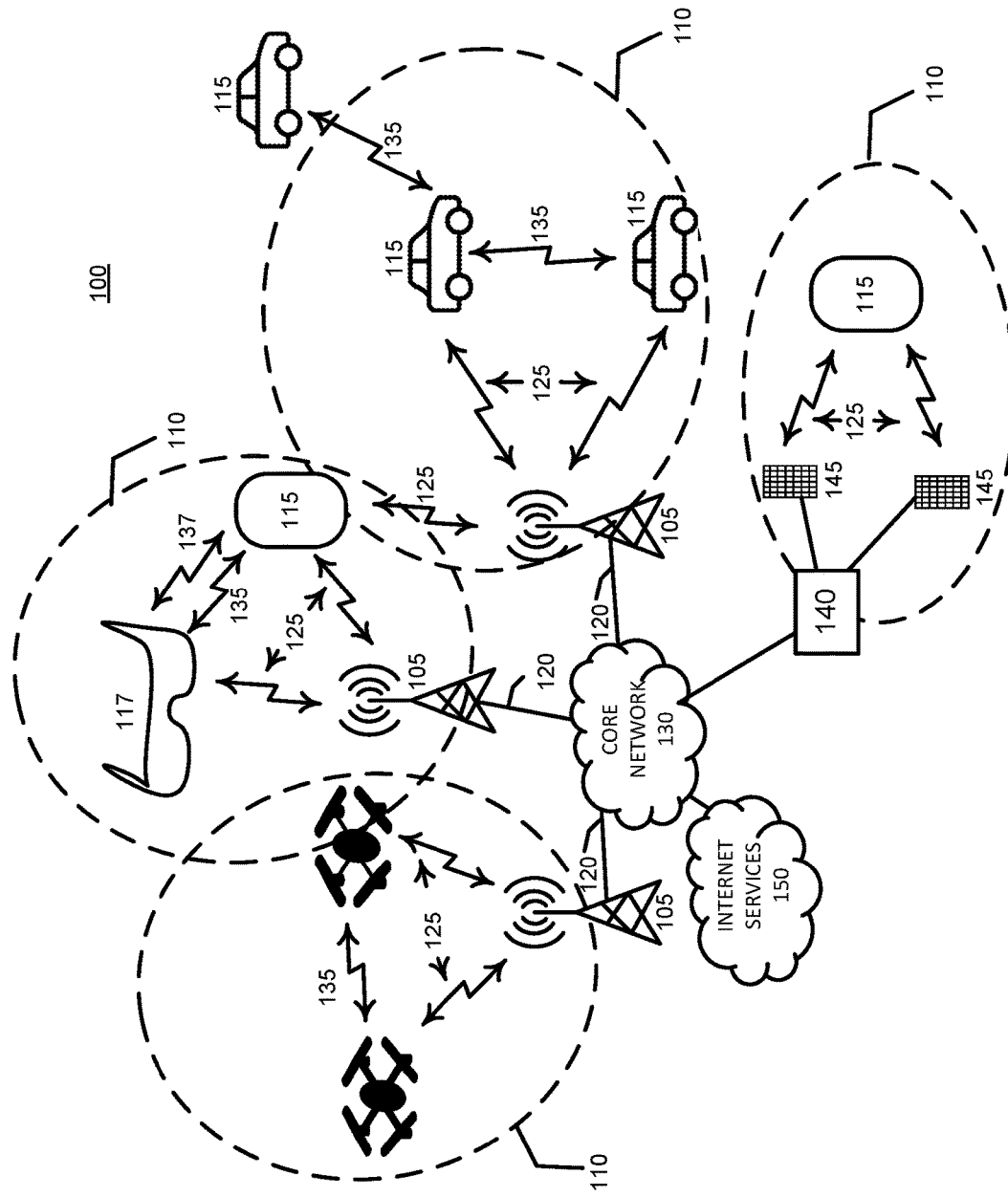
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass may consume NR radio resources at a given broadband data rate having more stringent radio latency and reliability criteria to provide a satisfactory end-user experience.

5G systems should provide support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologics for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ns)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG). UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking. Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet. Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network, transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SIF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions. P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
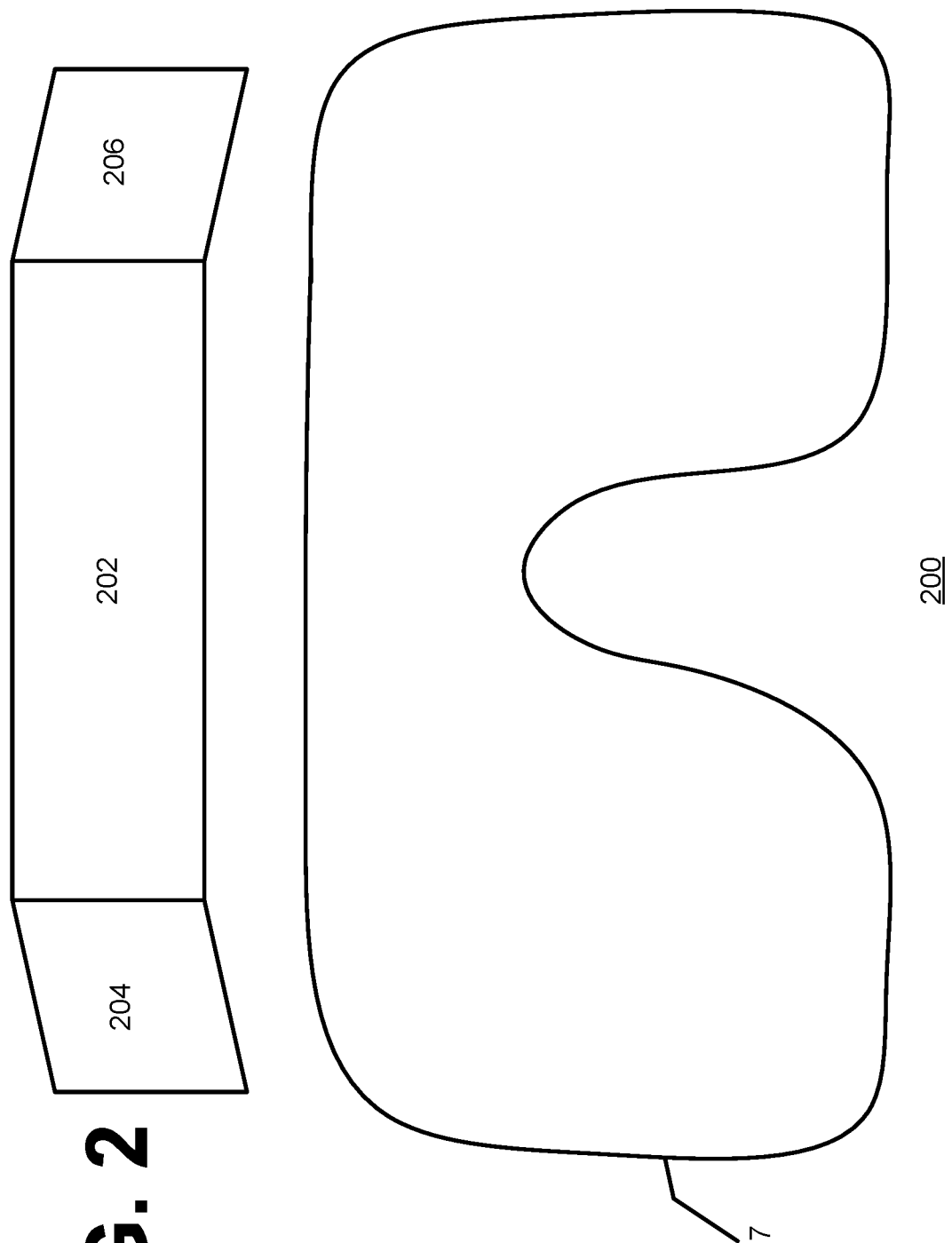
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5-G communication system using NR techniques, method, systems, or devices. For example, a wireless data traffic flow carrying visual information for display on center visual display portion 202 may be prioritized higher than a wireless data traffic flow carrying visual information for left visual display portion 204 or for right visual display portion 206.

The performance of a communication network in providing XR services may be at least partially determined according to satisfaction of users of the XR services. Each XR-service-using user may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

The 5G PDCCH channel may be beamformed according to favored, preferred, or assigned, channel vectors associated with each UE using embedded demodulation-assisting demodulation reference signals ("DMRS"). The PDCCH may be modulated by a fixed quadrature phase shift keying ("QPSK") modulation scheme and with a conservative coding rate such as the reliability of receiving the PDCCH channel at the device is maximized. For instance, to fulfill the URLLC $10e$-5 reliability level, the PDCCH channel decoding ability must be enhanced at the device end.

The resource size of a given PDCCH channel, which may be carrying downlink control information messages ("DCI") corresponding to one or more UEs, may be time-varying based on a PDCCH aggregation level. To enhance PDCCH decoding a wireless communication network may increase the resource size of a PDCCH channel and accordingly adopt a more conservative and resource-less-efficient coding rate of the PDCCH, which may result from a given amount of PDCCH control information being transmitted with a stronger coding rate (e.g., more redundant bits for error detection and correction) at the expense of consuming more channel resources for transmitting the PDCCH information.

Three types of PDCCH channels may be used. A first type of PDCCH channel may be a UE-specific PDCCH channel, in which determined channel resources are periodically monitored by a single UE/device. With such a UE-specific PDCCH channel a UE may be configured such that the specific UE device will attempt to blindly decode the determined UE-specific candidate resources in case they may be potentially carrying DCI information for the specific UE. Such DCI information may include configuration corresponding to scheduled uplink or downlink grants, transmission configurations, or information regarding common system signaling and updates.

Blind decoding may refer to the process of a UE attempting to decode a DCI with all possible transmission configurations and aggregation levels. This typically imposes high power consumption by the UE attempting to perform the blind decoding. However, blind decoding may be necessary because the UE is not yet aware of actual configurations of the PDCCH channel and corresponding transmissions. A UE typically becomes aware of such actual configurations after the UE successfully decodes a PDCCH resource opportunity. When in an active mode (e.g., RRC_CONNECTED), a UE monitors a configured one or more PDCCH search spaces, where a search space may comprise one or more candidate resources/opportunities that may carry the PDCCH/DCI information. The search space definitions facilitate determined UE attempts to decode a PDCCH due to the varying size of the PDCCH channel (i.e., varies due to aggregation levels corresponding to varying resource sizes to carry the PDCCH).

A second type of PDCCH channel may comprise common PDCCH search spaces that may be monitored by all UEs. Common PDCCH channels typically carry DCI information/messages that are relevant to all devices. Examples include system updates and control information, all-UE power control information, and general network/system information.

A third type of PDCCH channel may comprise group-common search spaces that may be monitored by all UEs but that may be decoded only by UEs of a given group.

For a scheduled downlink or uplink data traffic transmission, a preceding PDCCH control information transmission informs one or more UEs about the scheduled resources and transmission configurations to use for transmission in the uplink (e.g., from a UE) or reception in the downlink (e.g., to a UE) directions. Accordingly, PDCCH transmissions are needed for successful device transmission and/or reception, but should be considered as signaling overhead, which preferably should be minimized.

For URLLC use cases, transmissions may comprise small and sporadic packet transmissions. For each packet transmission, a UE-specific PDCCH DCI is typically transmitted to inform the target UE of the transmission or reception configurations. Such as scheme significantly increases the number of PDCCH transmissions, and accordingly, the amount of channel resources consumed by the PDCCH channels, which reduces the overall system capacity.

Inefficient use of overall capacity to transmit data, whether in a data channel or in a control channel, may result when PDCCH configuration and associated PDCCH transmission reliability does not differentiate between types of information being carried over a PDCCH. For example, two PDCCH transmissions, carrying scheduling information for lower and higher priority traffic flows, are typically modulated using the same QPSK modulation and with the same conservative coding rate to fulfill a given PDCCH reliability level. This may result in consuming, or allocating but not utilizing, a significant amount of bandwidth that could be used to transmit data just to facilitate PDCCH transmissions that correspond to low priority traffic. For XR services, where a large amount of data traffic is typically consumed, PDCCH transmissions' overhead is a critical limitation of the system offered capacity.

Resources (e.g., network bandwidth) which have been granted for an active user equipment associated with data flow having a given priority, or QoS, may be 'preempted' to facilitate a data flow associated with a higher-priority, or higher QoS, when a resource starvation (e.g., network bandwidth starvation) or network congestion situation manifests. Such preemption may be viewed as similar to procedures that have been adopted in computer science arts for microprocessors to preempt/interrupt less important functions or services for the sake of more important functions or services.

NR supports preemption in downlink and uplink directions. In the downlink direction, the network/RAN node, or component thereof, may identify arrival of higher priority traffic, or portions thereof (e.g., one or more packets) which is associated with a stringent latency budget for radio transmission or reception. In case of congestion, (e.g., there are not enough available radio resources for immediate scheduling and traffic transmission) the RAN node may determine an active user equipment device as lower priority device because it is associated with a lower priority traffic transmission. Based on this determination the RAN node may stop part of, or all of, the lower priority traffic transmission to such device, and instead transmits the higher-priority traffic over the radio resources that the lower priority device had been using for the lower priority traffic, which may be referred to as overtaken, or preempted, resources. Based on a higher or lower control channel scheduling information, the higher priority device is informed by the scheduled radio resources for receiving its higher priority traffic. Furthermore, the lower-priority device attempting decoding of traffic over the preempted resources previously granted to its, of which preemption the lower priority device has not yet been informed, leads to decoding failure by the preempted device. The RAN node, during the next available control channel occasion of the lower priority device, signals a preemption indication in the form of a downlink control channel information (DCI), where it instructs the lower priority device to flush its hybrid automatic repeat request (HARQ) buffer over the preempted resources. The achievable gain of such preemption awareness at the preempted device is to not spread the decoding error caused by the immediate preemption. To recover the capacity of the lower priority device, the RAN node retransmits lower priority code- and/or transport-blocks for the preempting, higher-priority traffic. This way, incoming higher priority traffic may not exhibit additional buffering latency due to resource congestion and has a higher likelihood of immediate scheduling and transmission using the preemption procedures.

In the uplink direction, preemption procedures are slightly different to that are of the downlink direction, due to the distributed nature of the uplink transmissions. A higher priority device transmits, in the uplink direction, a scheduling request towards the serving RAN node requesting a certain amount of resources. In case of uplink resource congestion, the RAN node responds with a scheduling grant which contains resources that partly or fully overlap with another active ongoing uplink transmission of a lower priority device. Before the high priority device initiates transmitting its traffic, the RAN node transmits a downlink control information towards the lower priority device, signaling it with the preemption indication, and instructing it to stop its transmission over the to-be-preempted radio resources. The uplink preemption is less effective in reducing the uplink traffic latency, compared to downlink preemption, since the lower priority device needs to be aware of the uplink preemption before the higher priority device initiates its uplink transmission.

Heretofore, preemption has not supported preempting of control channel resources of devices requiring various quality of service targets. That is, current preemption procedures require always-availability of control channel resources at both the preempting and preempted device. Such a need for always-available control channel resources may be attributed to limitations of devices being reactively aware of resource preemption. For virtual reality use cases, where extremely large payload sizes are periodically or semi-periodically transmitted, the availability of control channel resources may be limited. Specifically, virtual reality transmissions require extreme available bandwidth to fulfill the associated broadband data rate and stringent latency targets. Accordingly, a fast availability of the control channels carrying the data scheduling information of various virtual reality devices is available. However, due to always-limited radio bandwidth, increasing the frequency and resource pools for control channels leads to reducing the amount of available bandwidth for useful data transmissions, and thus, degrading overall spectral efficiency. This limits the effectiveness of the specified resource preemption techniques, specifically for the cellular/long-range wireless virtual reality use cases.

Embodiments and concepts disclosed herein facilitate resource preemption of control channels. QoS-stringent devices, without an available control channel search space (due to resource shortage), may utilize preempted resource pools when latency stringent traffic is available for transmission to a high-priority device, thus enabling resource flexibility of control channels as well as data channels. For example, current NR preemption techniques depend on the control channel always-availability of each device, which control channel availability may be greatly limited within virtual reality deployments, thus reducing the effectiveness of those preemption techniques. Preemptions techniques disclosed here facilitate prioritizing high QoS traffic without requiring that control channel resources for high priority devices and low priority devices are always available.

Figure 3:
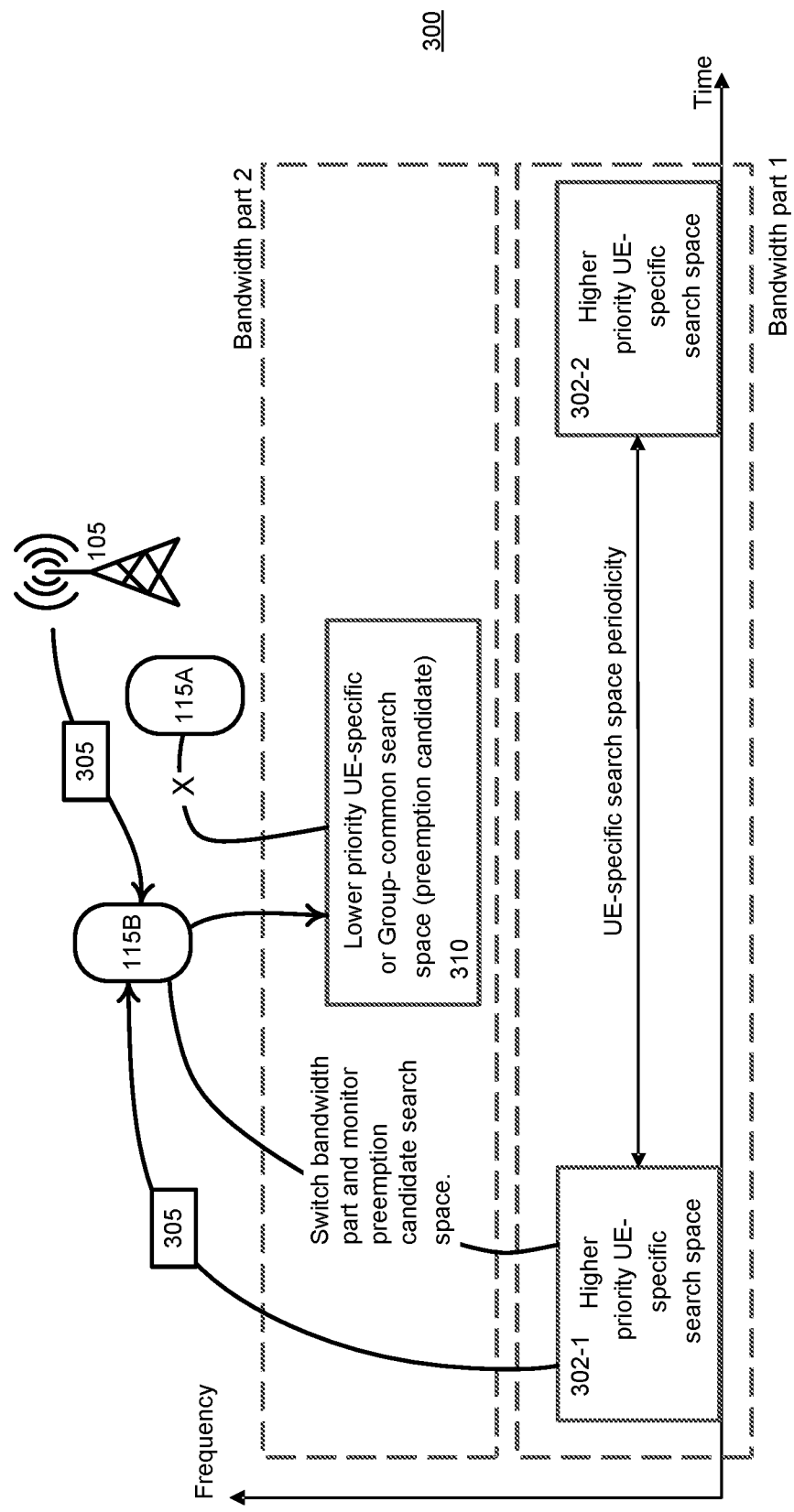
FIG. 3 illustrates a diagram of an example preemption of a control channel search space preemption candidate.
Figure 4:
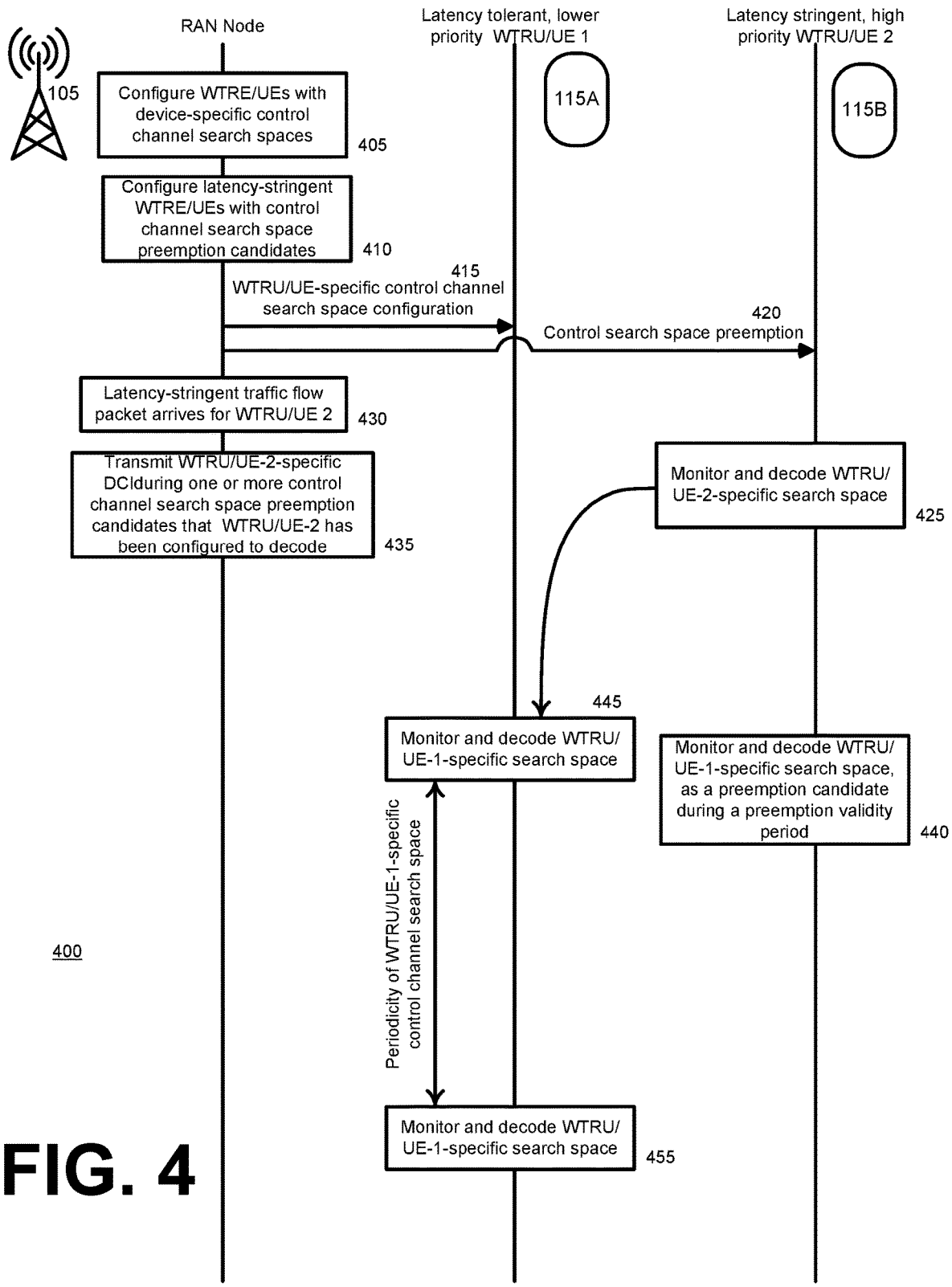
FIG. 4 illustrates a timing diagram of an embodiment method of preemption of a control channel search space preemption candidate.

Turning now to FIG. 3, the figure graphically illustrates an example preemption of a control channel search space preemption candidate 310 that has been allocated, or granted to, a first UE 115A. Higher priority UE 115B (e.g., higher priority than UE 115A because UE 115B may be processing, or receiving, a higher priority, more latency-stringent, traffic flow than UE 115B) may search, or monitor, search space 302-1 that UE 115B has been configured to search using a device-specific scrambling code or sequence, and retrieve scheduling information 305 from search space 302-1. Scheduling information 305 provides information that UE 115B uses to access a resource of control channel search space preemption candidate 310, which previously had been allocated to, or granted to, UE 115A. In an embodiment, scheduling information 305 be received by UE 115B from RAN node 105, or a component of the RAN node.

Higher priority device 115B, associated with a higher priority traffic than UE 115A, may be configured with one or more of the preemption candidate control channel search spaces, for example preemption candidate 310, regardless of whether UE 115B is configured with a device-specific control channel search space such as search spaces 302. The configured preemption candidate search spaces may be device-specific or device-group-common control search spaces associated with a plurality of lower priority devices that are carrying lower priority traffic. When a portion of a high priority traffic flow, for example a packet of a high priority traffic flow associated with a stringent latency budget, destined for UE 115B arrives at RAN node 105, the RAN node transmits a scheduling grant in a downlink control information during one or more of the configured preemption candidates. The higher priority device monitors the additional configured preemption candidate 310 and accordingly decodes, blindly or not blindly, scheduling grants provided in the preemption candidate. This may result in a smaller end to end latency for the high priority traffic flow due to the expedited control channel scheduling using the proposed control channel preemption instead of UE 115B having to wait until the next device-specific search space 302-2. After RAN 105 provides scheduling information 305 in preemption candidate 310, typically using a scrambling code that corresponds to UE 115B but that does not correspond to UE 115A, UE 115A should exhibit a failed decoding of preemption candidate 310 (as shown in FIG. 3 by the 'x' over the line connecting preemption candidate 310 and UE 115A) since the control channel search space preemption candidate has been preempted and the other higher priority device scrambling code and/or sequence is used to encrypt the transmitted control channel 310. UE 115A is not aware of the preemption, and upon decoding failure, the UE should wait for receiving and decoding the next available device-specific control channel occasion that it has been configured to decode.

As depicted by FIG. 3, a higher priority device may be configured with a standard device/UE-specific control channel search space, for receiving scheduling information of higher priority traffic. Furthermore, one or more of the control channel preemption candidates are configured for the higher priority device to receive a faster downlink control information of latency stringent traffic arrivals, when the device specific control channel is not available. A candidate preemption search space implies a search space that is associated with a lower priority device, which is active and has an ongoing traffic session. In particular, the candidate preemption search space can be dynamically overtaken or dictated by the DCI scheduling information of the higher priority device. That is, the RAN node may transmit the DCIs associated with the higher priority device during the preemption search space that was originally associated with one or more of the lower priority device(s), and using the corresponding scrambling codes or sequences of the higher priority device. Upon receiving those configurations, the higher priority device monitors its UE-specific control search space and the configured one or more candidate preemption search spaces during the indicated validity period/timer. Therefore, when there is a latency stringent payload arrival of the higher priority device, and where there is not a fast UE-specific control channel occasion associated with the device, the RAN node instantly transmits its new scheduling information during the first available configured candidate preemption search space, hence reducing the scheduling buffering latency.

The configurations of the preemption candidate search spaces include any of the following information elements combinations: Index and/or ID of each candidate preemption search space; Frequency and timing resources including periodicity of each candidate preemption search space; Validity of the candidate search space for preemption, where it implies the numbers or instances of the candidate search space and/or timing threshold over which the candidate preemption is available for preemption of the scheduling information of the higher priority device; Bandwidth part index and/or ID, in case that any of the associated candidate preemption search spaces are within a bandwidth part that is different from the active bandwidth part of the preempting higher priority device, hence, a bandwidth part switching is needed.

Various options may be used for delivering the candidate preemption search space configurations to the higher priority devices as follows. For example, control channel search space preemption candidate scheduling/configuration information 305 may be delivered to UE 115B using higher layer signaling such as system information block ("SIB") and/or radio resource control signaling ("RRC"). Due to the slower signaling frequency and being common to all existing higher priority devices 115, preemption candidate search spaces should be active or available until there is another updated configuration set. Otherwise, the candidate preemption search spaces would only be available during the activity time of the lower priority devices that they are associated with before scheduling information, such as scheduling information 305, is provided to a higher priority device. This may be beneficial when search space preemption candidates are dedicated for preemption, e.g., when being used as complementary search spaces for higher priority devices instead of being associated with other active lower priority devices, which may use the preemption candidates unless they are preempted by a UE associated with a higher priority. This embodiment requires less signaling overhead of the candidate preemption search spaces, but may come at the expense of increased control channel overhead due to defining always-active static candidate preemption search spaces.

In an embodiment, control channel search space preemption candidate scheduling/configuration information 305 may be delivered to UE 115B using lower layer signaling such as downlink control information (DCI). The preemption candidate configurations 305 can be dynamically provided using the lower layer fast DCI signaling. That is, higher priority devices may be dynamically signaled of the availability of one or more search spaces preemption candidates that are time varying depending on the availability and activity time of the lower priority devices. This option avoids configuring static control channel search spaces as candidates for preemptions, thus reducing use of control channel capacity.

A WTRU/UE 115B may receive control channel preemption configurations 305 from serving RAN node 105, based on higher or lower layer signaling such as RRC, DCI and SIB, including bandwidth part IDs/indices of each preemption candidate search space, corresponding timing and frequency resources, periodicity, aggregation level, modulation and coding scheme, scrambling code of preempted search space (e.g., C-RNTI, TMSI or preemption-specific code), and/or search space index/ID. The WTRU/UE 115B monitors and decodes, blindly, or not blindly, WTRU/UE-specific control channel search space 302-1 using WTRU/UE-specific scrambling code. The WTRU/UE 115B monitors and blindly, or non-blindly, decodes the configured candidate preemption search space(s) 301 using the preemption-specific scrambling code(s) contained in preemption information 305.

Figure 5A:
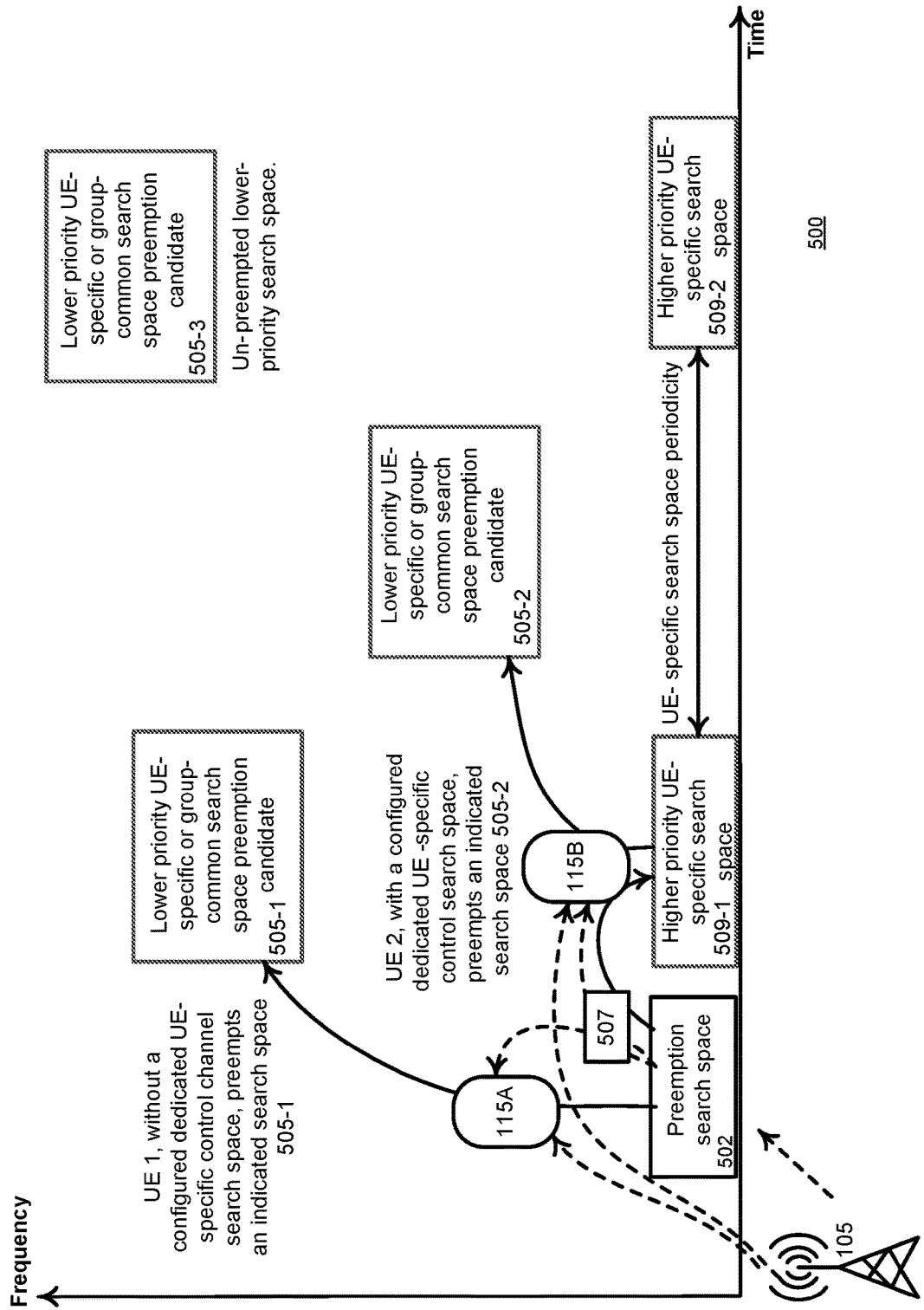
FIG. 5A illustrates a diagram of an example control channel search space preemption with a preemption search space.

Turning now to FIG. 5A, the figure illustrates a diagram of example preemption 500 of control channel search/ monitor space candidates using a configured preemption control channel space 502. RAN 105 may configure UEs 115A and 115B to search/monitor control channel preemption search space 502 according to a common scrambling code or sequence. RAN 105 may configure UEs 115A and 115B to search control channel search space preemption candidates 505 according to a common scrambling code or sequence, or according to UE-specific scrambling codes or sequences corresponding to UEs 115A and 115B. When UE 115A monitors preemption search space 502, preemption information 507, which may include preemption notification information or preemption configuration information, may instruct UE 115A to monitor lower-priority preemption candidate 505-1 based on UE 115A being associated with a low priority traffic flow. Preemption configuration information 507 may also instruct UE 115B, which may be associated with a higher priority traffic flow than is UE 115A, to monitor and decode control channel search space preemption candidate 505-2. In an embodiment, instead of preemption configuration information 507 instructing UE 115B to monitor and decode control channel search space preemption candidate 505-2, the preemption configuration information may be embedded in control channel search space 509-1, which specifically is associated with UE 115B based on a UE-specific scrambling code or sequence. When UE 115B monitors and decodes device-specific search space 509-1, the UE may decode the search space and retrieve therefrom preemption configuration information 507 that instructs UE 115B to monitor and decode control channel search space preemption candidate 505-2. In an embodiment, preemption configuration information 507 may include preemption notification information that informs UE 115A that preemption candidate 505-2 has been allocated to, granted to, or preempted by, UE 115B, and the preemption notification information may inform UE 115B that UE 115A has preempted, has been allocated, or has been granted, search space preemption candidate 505-1. In an embodiment, UE 115A may have been configured to monitor and decode preemption candidate 505-2 using a device-specific scrambling code or sequence specific to UE 115A. Thus, being informed that preemption candidate 505-2 has been allocated to, or granted to, UE 115B allows UE 115A to sleep until after a preemption validity period expires so that UE 115B does not try to decode, and fail to decode, preemption candidate 505-2 until after the preemption period has run. After the preemption period has run UE 115B may resume just monitoring and decoding device specific control channel search space 509-2. FIG. 5A shows preemption candidate 505-3 that was not preempted by either UE 115A or UE 115B so it would have been available for preemption, for example, if RAN 105 had determined, and configured search space 509-1 to instruct UE 115B to use preemption candidate 505-3 instead of, or in addition to, preemption candidate 505-2.

A control channel preemption search space 502 may be defined such that it carries, or comprises, control channel preemption indications of higher-priority devices. Accordingly, active higher priority devices may or may not be configured with WTRU/UE-specific control channel space and may be configured to monitor and blindly or non-blindly decode the one or more candidate preemption search spaces. Such grants, or allocations, may be determined and transmitted as preemption indication DCIs during each occasion of the preemption search space 502. As shown by the example FIG. 5A, WTRU/UE 115A is not configured with a WTRU-specific control channel search due to control channel resource congestion. In an embodiment, WTREU/ UE 115A may have been configured with a device-specific control channel search space which has been preempted by another UE. However, WTREU/UE 115A has been configured to monitor and decode one or more of the available lower priority candidate preemption search spaces 505-1. The second UE, EU 115B, is associated with a more latency stringent payload arrival, and is configured with both WTRU-specific and one or more preemption candidate search spaces, such as preemption candidate 505-2 as discussed above. This way, UEs with or without dedicated control channel access can still fulfill their radio latency targets, while maximizing both the control and data channel capacity. Furthermore, latency stringent UEs, with infrequent traffic arrivals, can benefit from the configured candidate preemption search spaces over lower priority devices while not unnecessarily overbooking the control channel resources, leading to increased resource amount being free, or available, for useful data traffic transmissions, thus enhancing overall radio spectral efficiency associated with RAN 105.

In an embodiment, a WTRU/UE 115 receives configurations of control channel preemption search space 502 including timing and frequency resources of the preemption search space, aggregation level, modulation and coding scheme, and bandwidth part ID; WTRU monitoring and blindly decoding the configured control channel preemption search space, using the configured preemption search space scrambling codes or sequences. WTRU/UE 115 decodes the control channel preemption indication from preemption search space 502 and determines a preemption information 507 including information elements of an identifier and/or index of a preempted search space 505, a preemption validity period or an upcoming number of occurrences of the preemption candidate search space and scrambling codes associated with the search space preemption candidate. The WTRU/UE 115 monitors and decodes the next available candidate preemption search space and determining its DCI scheduling information for data traffic flow reception.

Turning now to FIG. 5B, the figure illustrates example preemption information 507. Preemption search space configuration information 507 may comprise control channel preemption indications, that may comprise any of the following information element's combinations, as depicted by the example of FIG. 5B: Information of the to-be-preempted control channel search spaces including timing and frequency resources, bandwidth part ID or index, search space ID or index, aggregation level, modulation and coding scheme, and associated scrambling codes/sequences, and/or The ID of the preempting active higher priority device, e.g., TMSI, C-RNTI, and/or The preemption validity period of the corresponding search space, where it implies either a timer in ms and/or a number of occurrences of the preempted search space. Higher priority device should assume that configured preemption candidate search spaces are always available for receiving preemption scheduling information the duration of a configured preemption validity period.

Figure 6:
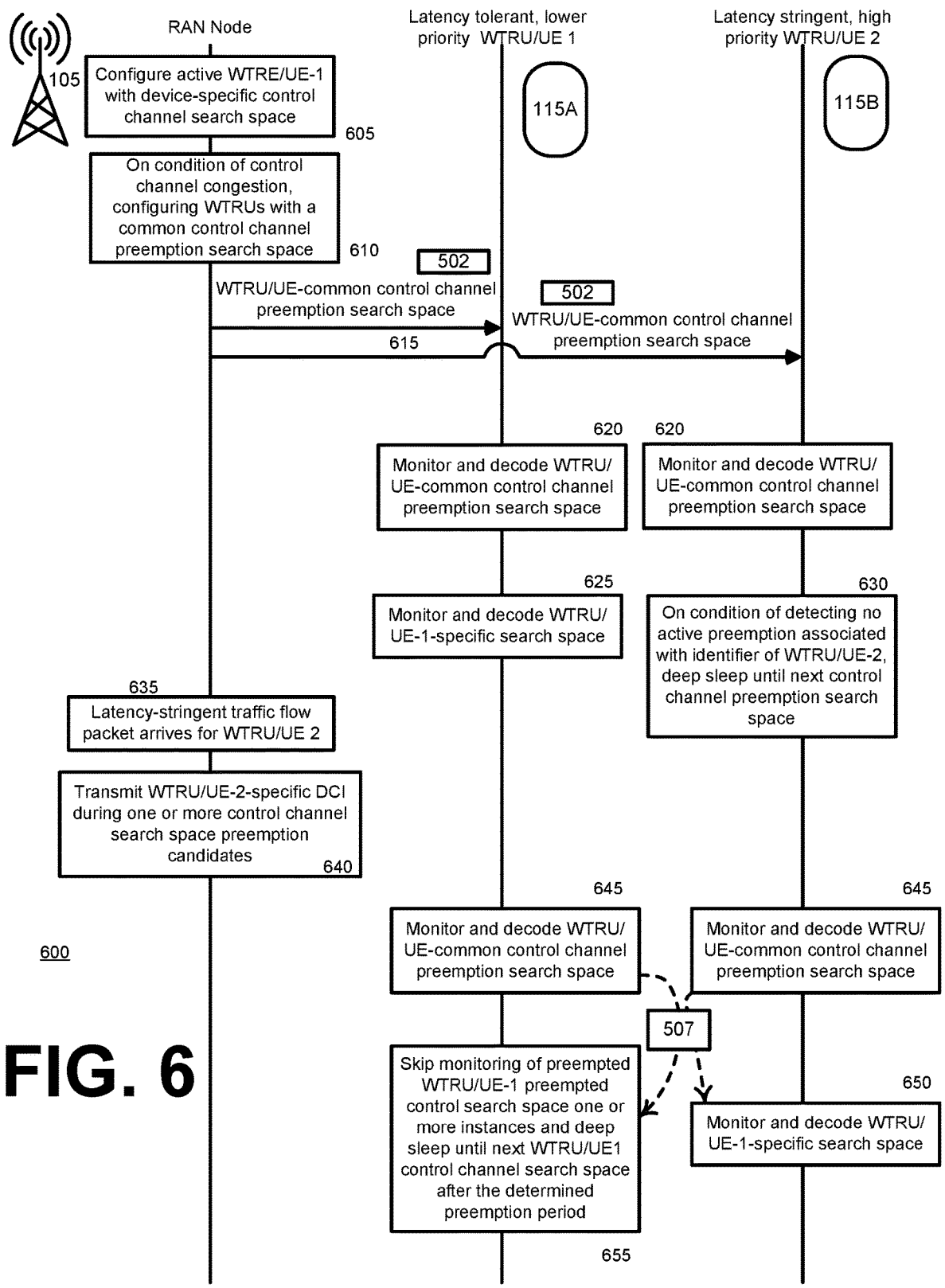
FIG. 6 illustrates a timing diagram of an example method to preempt a control channel search space preemption candidate using a preemption search space.

Turning now to FIG. 6, the figure illustrates timing diagram of an example method 600 to preempt a control channel search space preemption candidate, such as a preemption candidate 505-1 or 505-2 shown in FIG. 5A using a preemption search space, such as preemption search space 502 as shown in FIG. 5A. In method 600 shown in FIG. 6, a RAN node component 105 configures UE 115A with a device specific control channel search space at step 605. If RAN node 105 determines that network congestion exists, or if control channel congestion exists, at step 610 the RAN node may configure each of UEs 115A and 115B with a common control channel preemption search space 502 at step 615.

At step 620 both UE 115A and 115B monitor and decode the common control channel preemption search space 502. At step 625 UE 115A monitors and decodes the device specific search space that was configured for it to monitor and decode at step 605. UE 115A operates according to information retrieved from the decoded device specific search space.

At step 630 UE 115B detects no preemption information from the monitoring that it performed at step 620 of the common control channel preemption insert space. Therefore, at step 630, after making such a determination, UE 115B enters a sleep mode until the next configured control channel preemption search space 502 is configured to occur.

At step 635 RAN node component 105 determines that latency stringent traffic flow has arrived for forwarding to UE 115 B. The latency stringent traffic flow may refer to high priority traffic flow, or a packet flow that requires a high quality of service to minimize latency. At step 640 RAN node 105 transmits a downlink control information during one or more control channel search space preemption candidates that were configured at step 610. At step 645 both UE 115A and UE 115B monitor and decode the common control channel preemption search space 502. Unlike the monitoring and decoding of the preemption search space that occurred at step 620, the monitoring and decoding that occurs at step 645 indicates preemption configuration information 507 is contained within the common control channel preemption search space. Preemption information 507 may include information that notifies UE 115A that UE 115B will be preempting the device-specific control channel search space that was configure for UE 115A at step 605. Preemption information 507 may also include information that instructs UE 115B to monitor and decode at step 655 the device-specific control channel search space that was configured for, allocated to, or granted to UE 115A at step 605. Because UE 115A has been notified that its device-specific control channel search space that was configured for UE 115A at step 605 is being preempted, UE 115A enters a sleep mode and remains in that sleep mode until a predetermined preemption expires.

Figure 7A:
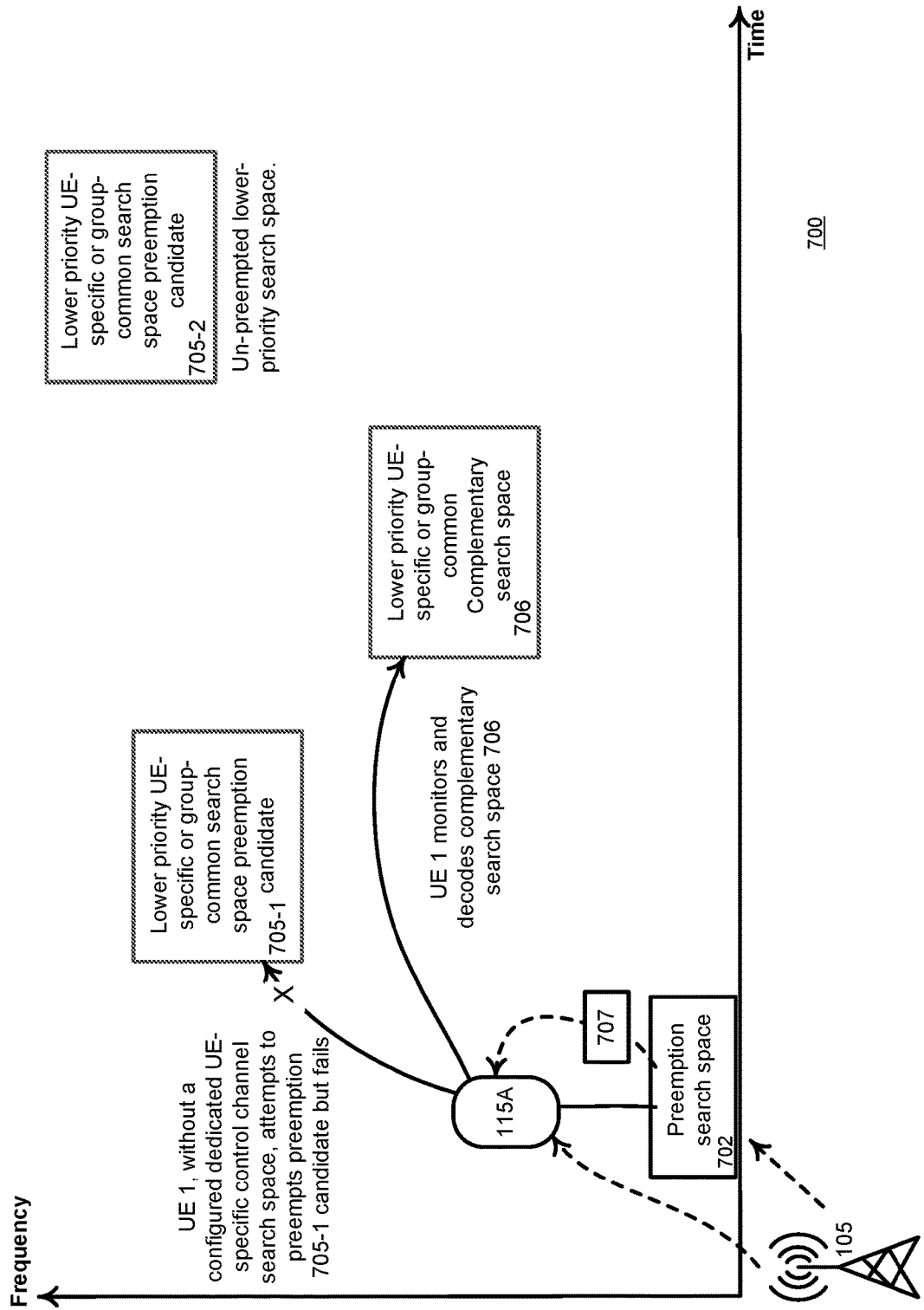
FIG. 7A illustrates diagram of an example preemption of a control channel search space candidate with a complementary search space.

Turning now to FIG. 7A, the figure illustrates diagram of a preemption 700 of control channel search space candidates using a complementary search space. If a lower-priority UE, such as UE 115A, has been preempted from using a device specific control space, and/or has been preempted from searching control channel search space preemption candidate, as discussed above in reference FIGS. 3-6, a lower priority device, which has had its control channel search space preempted, may have to wait to the next available WTRU/UE-specific control channel occasion to recover from the failed preempted control channel reception, which may lead to extended control channel decoding latency. Using a complementary control channel search space may facilitate recovery of control channel functionality by the lower priority device 115A. RAN node 105, upon preempting a certain control search space in favor of a higher priority UE, may configure preempted UE/WTRU 115A with an advance control channel search space, referred to herein as a complementary search space, such that UE 115A does not need to delay receiving its scheduling information by a full connected DRX cycle up to the next available control channel occasion, thus, reducing control channel decoding latency even for lower priority devices.

Preemption search space 702 (similar to preemption search space 502 discussed in reference to FIG. 5A, FIG. 5B, or FIG. 6) may configure UE 115A with preemption information 707 to search configured (by RAN 105) complementary search space 706. Thus, even though UE 115A may have failed to decode preemption candidate 705-1 (as depicted by the 'x' in FIG. 7A over the attempt by UE 115A to decode preemption candidate 705-1), RAN 105 may dynamically configure complementary space 707 for use by UE 115A before a preemption period runs, or before the next DRX cycle of UE 115A occurs. Thus, un-preempted preemption candidate search space 705-2 remains available for use by other UEs that may be associated with a higher priority traffic that UE 115A, but UE 115A may still receive downlink control channel information without having to wait to its next DRX cycle search opportunity or for the end of a current preemption validity period.

Turning now to FIG. 7B, the figure illustrates example complementary search space configuration information 707. Control channel preemption search space 702 may comprise configuration information 707 that indicates configuration assignments for complementary lower priority search space 706. An entry of configuration 707 may comprise indications that may be associated with information of a complementary lower priority search space 706 including timing and frequency resources, aggregation level, and search space index or search space identifier. In case there is not any search space or identifier in information 707, or in case there is a NULL indicating no complementary search space information in the transmitted preemption indication, the preempted lower priority device may be configured to wait until its next available control channel occasion (e.g., its next DRX search space occasion. If configuration information 707 identifies a complementary search space, the to-be-preempted lower priority device would not need to wait the rest of its configured DRX cycle to receive its buffered control channel information. Instead, the preempted device avoids monitoring and decoding its previously configured search space and accordingly, decodes the subsequent configured complementary search space 706. This way, the RAN node can flexibly preempt lower priority control channel search spaces for the sake of latency stringent higher priority control channel transmissions without significantly increasing latency delay in control channel decoding for lower priority devices.

Figure 8:
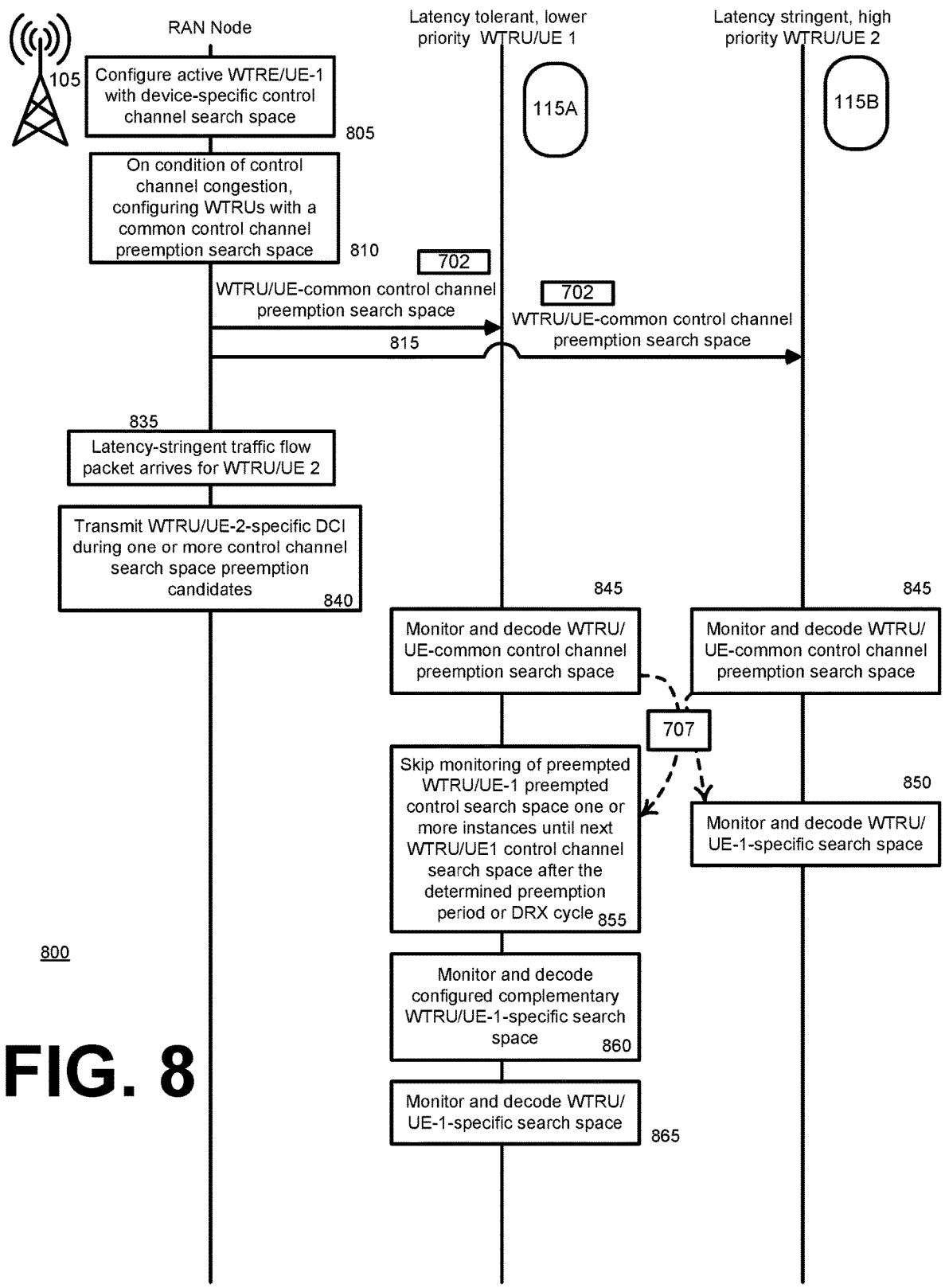
FIG. 8 illustrates a timing diagram of an example method of preemption of a control channel search space preemption candidate using a complementary search space.

Turning now to FIG. 8, the figure illustrates a timing diagram of an example method 800 of preempting control channel search space candidates using complementary search spaces 706 to preempt a control channel search space preemption candidate, such as preemption candidate 705-1 or 705-2 shown in FIG. 7A using a preemption search space, such as preemption search space 702 as shown in FIG. 7A. In method 800 shown in FIG. 8, a RAN node component 105 configures UE 115A with a device specific control channel search space at step 805. If RAN node 105 determines that network congestion exists, or if control channel congestion exists, at step 810 the RAN node may configure each of UEs 115A and 115B with a common control channel preemption search space 702 at step 815.

At step 835 RAN node component 105 determines that latency stringent traffic flow has arrived for forwarding to UE 115 B. The latency stringent traffic flow may refer to high priority traffic flow, or a packet flow that requires a high quality of service to minimize latency. At step 840 RAN node 105 transmits a downlink control information during one or more control channel search space preemption candidates that were configured at step 810. At step 845 both UE 115A and UE 115B monitor and decode the common control channel preemption start space 702. Preemption information 707 may include information that notifies UE 115A that UE 115B will be preempting the device-specific control channel search space that was configure for UE 115A at step 805. Preemption information 707 may also include information that instructs UE 115B to monitor and decode at step 850 the device-specific control channel search space that was configured for, allocated to, or granted to UE 115A at step 805. Because UE 115A has been notified that its device-specific control channel search space that was configured for it at step 805 is being preempted, and thus UE 115A need not attempt to decode the device-specific preemption candidate that was previously granted to it, instead of entering a sleep mode at step 855, UE 115A may monitor and decode a complementary search space at step 860 based on configuration information contained in preemption information 707 instead of waiting until the next DRX search opportunity corresponding to, and configured for, UE 115A occurs. After a preemption validity period, which may be included in preemption information 707, expires, UE 115A may resume monitoring a decoding its device-specific control channel search space at step 865.

In an embodiment, a WTRU/UE receives preemption information 707, as part of a preemption indication DCI and/or sequence set, one or more complementary control channel search space indications including information of the corresponding timing and frequency resources, aggregation level, modulation and coding scheme, and its associated validity period. Upon determining or detecting preemption of its device specific control channel search space, the WTRU/UE may, based on the received control preemption indication in preemption information 707, monitor and decode the complementary control channel search space.

Figure 9:
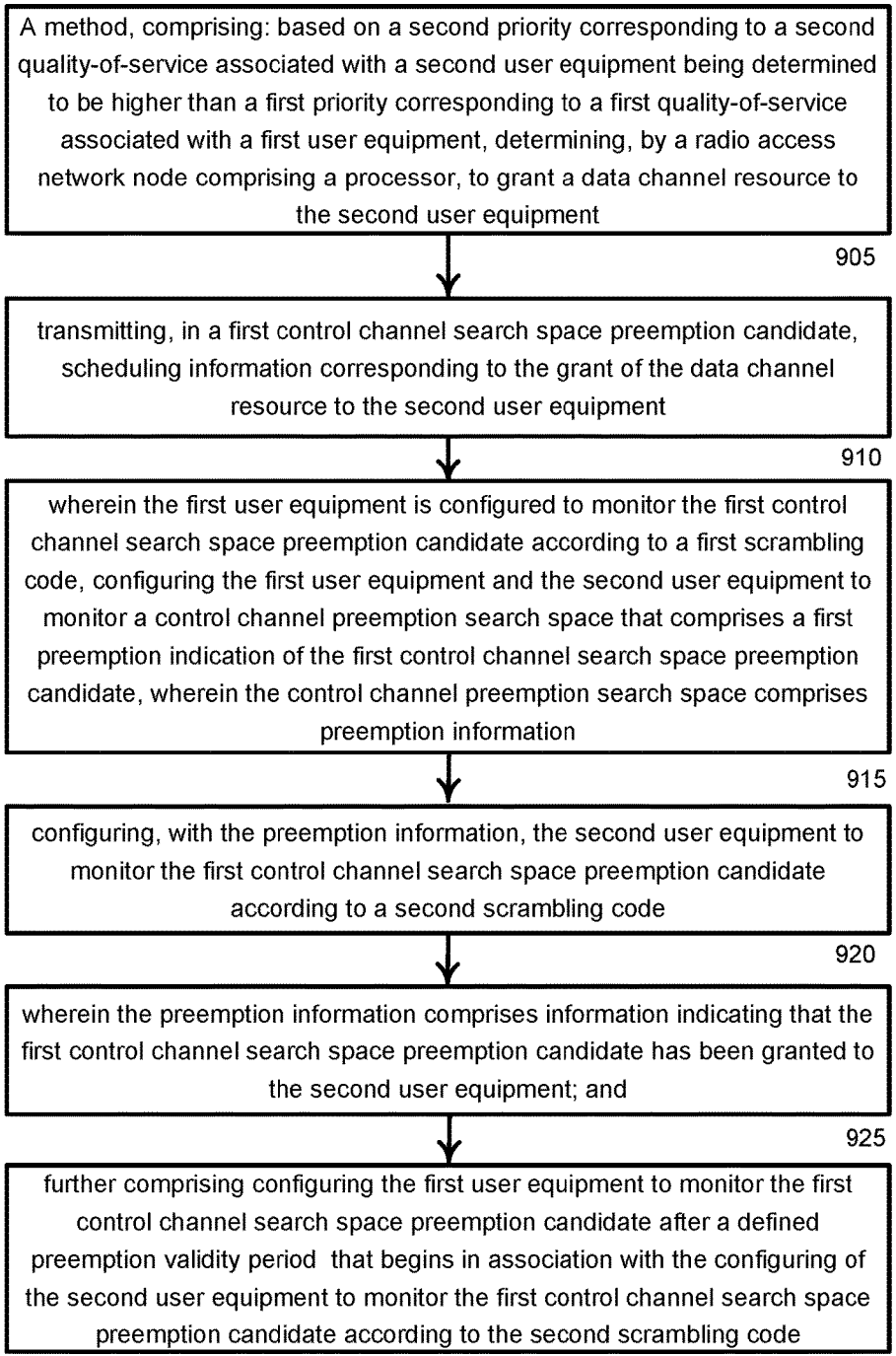
FIG. 9 illustrates a block diagram of an example method.

Turning now to FIG. 9, the figure illustrates an example embodiment method 900 a method comprising at block 905 based on a second priority corresponding to a second quality-of-service associated with a second user equipment being determined to be higher than a first priority corresponding to a first quality-of-service associated with a first user equipment, determining, by a radio access network node comprising a processor, to grant a data channel resource to the second user equipment; at block 910 transmitting, in a first control channel search space preemption candidate, scheduling information corresponding to the grant of the data channel resource to the second user equipment; at block 915 wherein the first user equipment is configured to monitor the first control channel search space preemption candidate according to a first scrambling code, configuring the first user equipment and the second user equipment to monitor a control channel preemption search space that comprises a first preemption indication of the first control channel search space preemption candidate, wherein the control channel preemption search space comprises preemption information; at block 920 configuring, with the preemption information, the second user equipment to monitor the first control channel search space preemption candidate according to a second scrambling code; at block 925 wherein the preemption information comprises information indicating that the first control channel search space candidate has been granted to the second user equipment; and at block 930 further comprising configuring the first user equipment to monitor the first control channel search space preemption candidate after a defined preemption validity period that begins in association with the configuring of the second user equipment to monitor the first control channel search space preemption candidate according to the second scrambling code.

Figure 10:
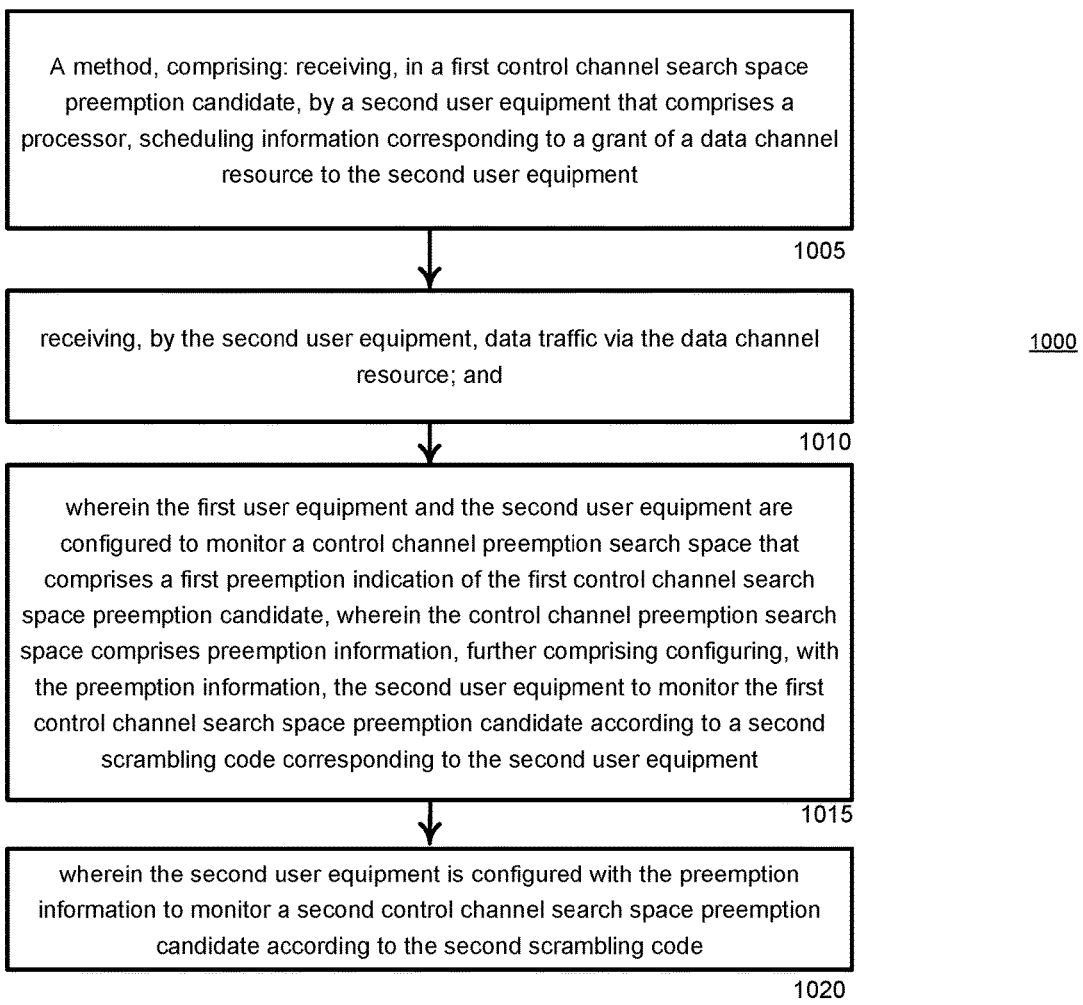
FIG. 10 illustrates a block diagram of another example method.

Turning now to FIG. 10, the figure illustrates an example method comprising at step 1005 receiving, in a first control channel search space preemption candidate, by a second user equipment that comprises a processor, scheduling information corresponding to a grant of a data channel resource to the second user equipment; at step 1010 receiving, by the second user equipment, data traffic via the data channel resource; at step 1015 wherein the first user equipment and the second user equipment are configured to monitor a control channel preemption search space that comprises a first preemption indication of the first control channel search space preemption candidate, wherein the control channel preemption search space comprises preemption information, further comprising configuring, with the preemption information, the second user equipment to monitor the first control channel search space preemption candidate according to a second scrambling code corresponding to the second user equipment; at step 1020 wherein the second user equipment is configured with the preemption information to monitor a second control channel search space preemption candidate according to the second scrambling code.

Figure 11:
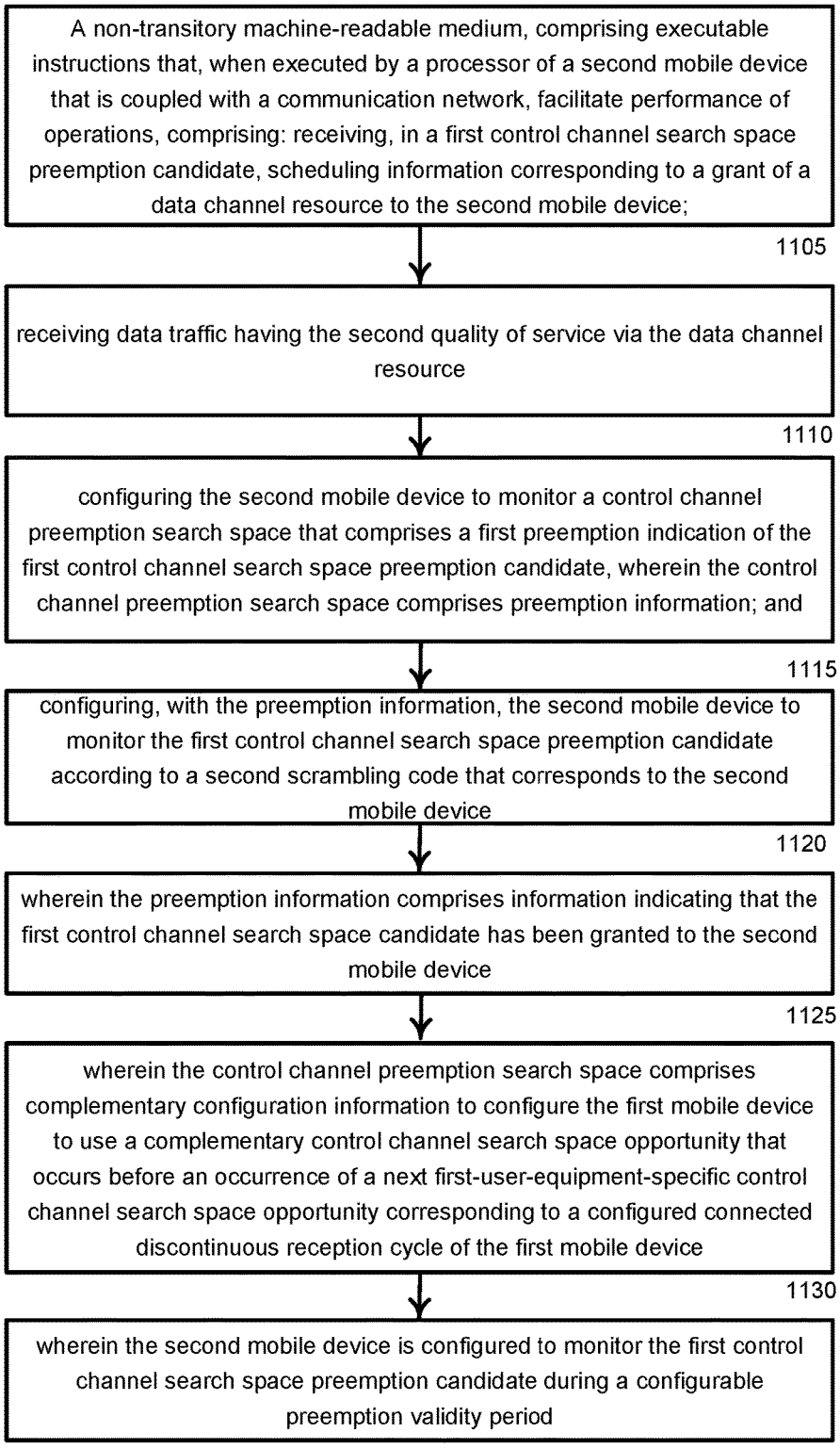
FIG. 11 illustrates a block diagram of an example non-transitory machine-readable medium.

Turning now to FIG. 11, the figure illustrates a non-transitory machine-readable medium 1100 at block 1105 executable instructions that, when executed by a processor of a second mobile device that is coupled with a communication network, facilitate performance of operations, comprising: receiving, in a first control channel search space preemption candidate, scheduling information corresponding to a grant of a data channel resource to the second mobile device; at block 1110 receiving data traffic having the second quality of service via the data channel resource; at block 1115 configuring the second mobile device to monitor a control channel preemption search space that comprises a first preemption indication of the first control channel search space preemption candidate, wherein the control channel preemption search space comprises preemption information; at block 1120 configuring, with the preemption information, the second mobile device to monitor the first control channel search space preemption candidate according to a second scrambling code that corresponds to the second mobile device; at block 1125 wherein the preemption information comprises information indicating that the first control channel search space candidate has been granted to the second mobile device; at block 1130 wherein the preemption control channel search space comprises complementary configuration information to configure the first mobile device to use a complementary control channel search space opportunity that occurs before an occurrence of a next first-user-equipment-specific control channel search space opportunity corresponding to a configured connected discontinuous reception cycle of the first mobile device; at block 1135 wherein the second mobile device is configured to monitor the first control channel search space preemption candidate during a configurable preemption validity period.

Figure 12:
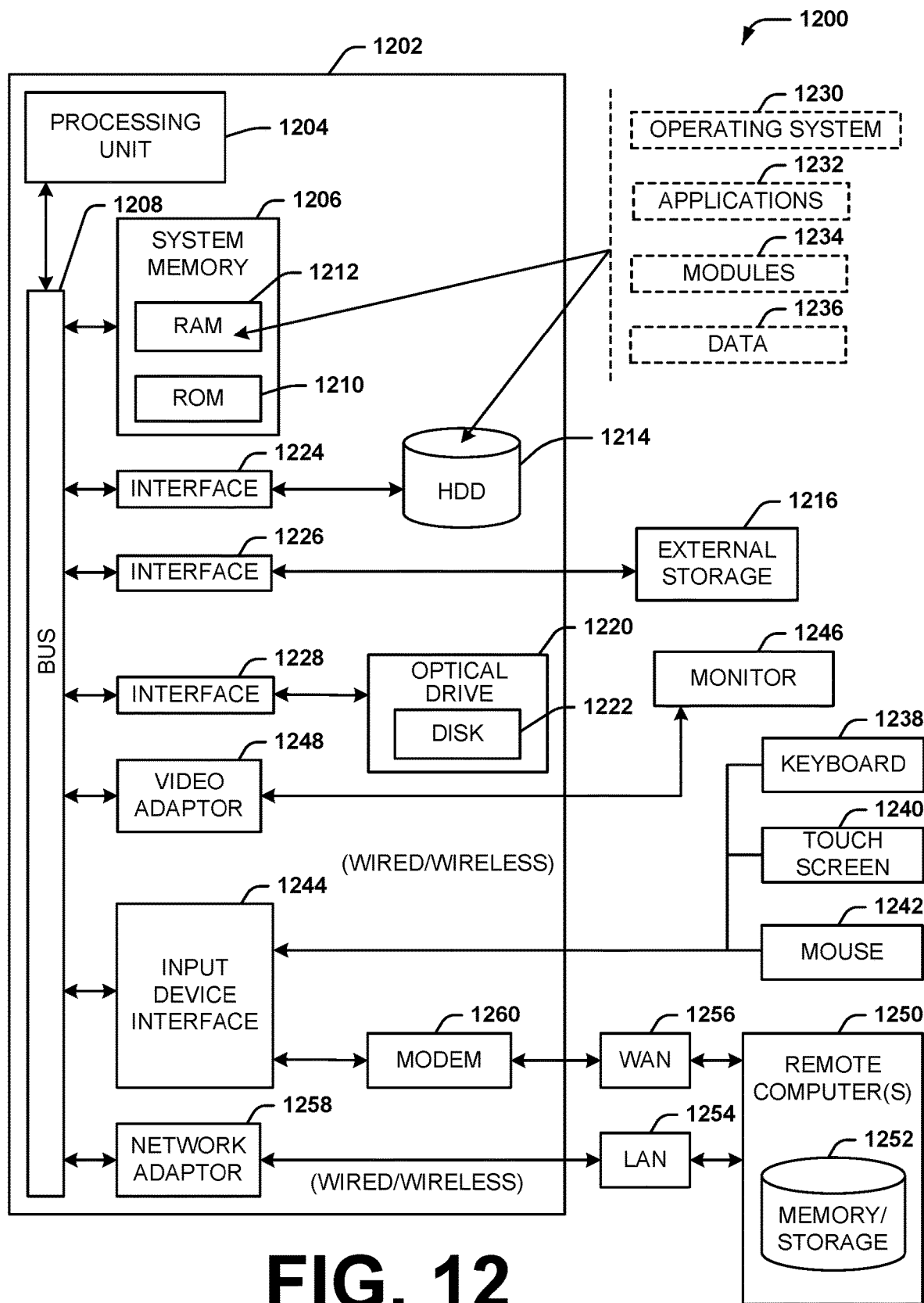
FIG. 12 illustrates an example computer environment.

In order to provide additional context for various embodiments described herein, FIG. 12 and the following discussion are intended to provide a brief, general description of a suitable computing environment 1200 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

Computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
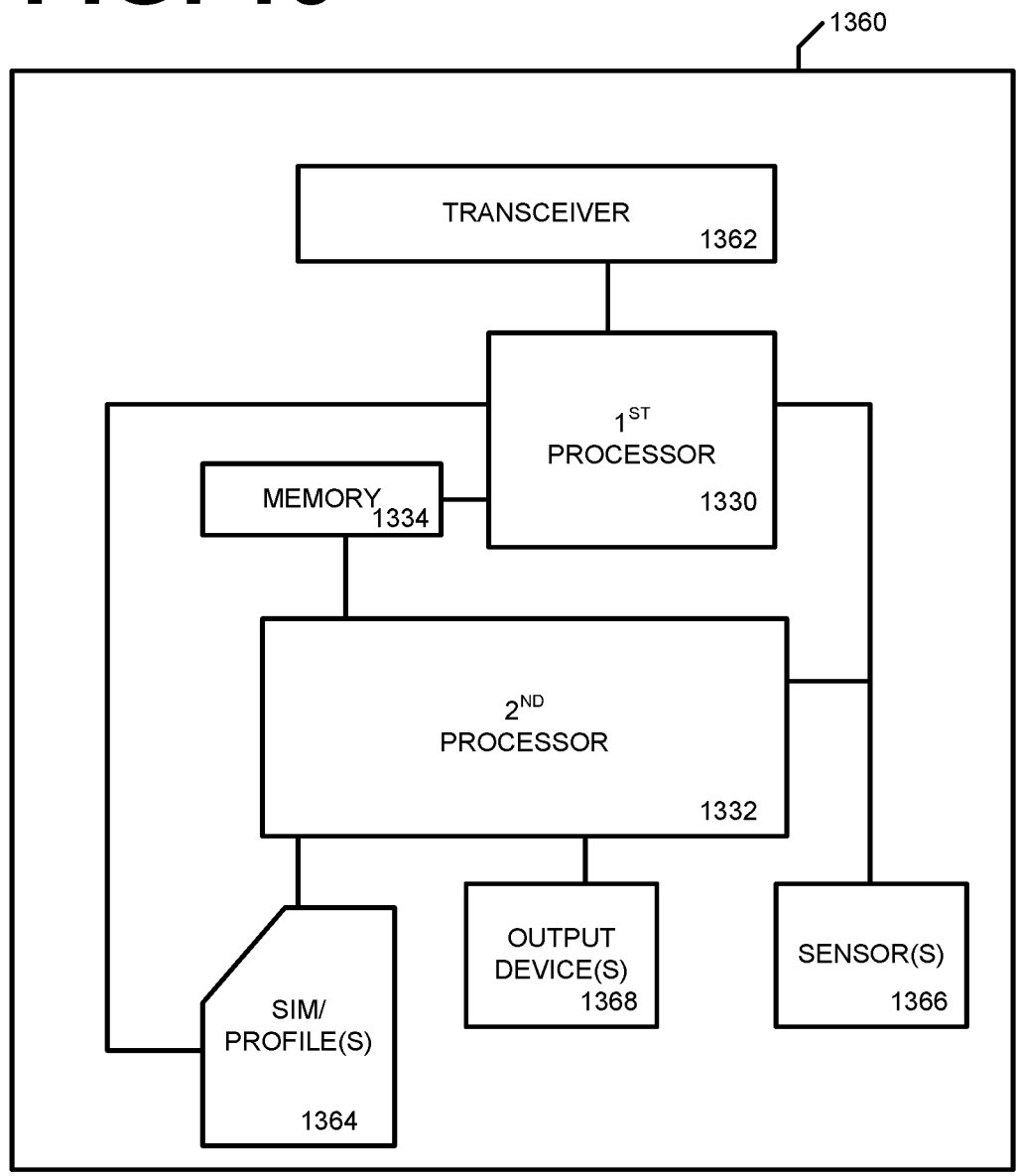
FIG. 13 illustrates a block diagram of an example wireless UE.

Turning to FIG. 13, the figure illustrates a block diagram of an example UE 1360. UE 1360 may comprise a smart phone, a wireless tablet, a laptop computer with wireless capability, a wearable device, a machine device that may facilitate vehicle telematics, and the like. UE 1360 comprises a first processor 1330, a second processor 1332, and a shared memory 1334. UE 1360 includes radio front end circuitry 1362, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1362 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 13, UE 1360 may also include a SIM 1364, or a SIM profile, which may comprise information stored in a memory (memory 34 or a separate memory portion), for facilitating wireless communication with RAN 105 or core network 130 shown in FIG. 1. FIG. 13 shows SIM 1364 as a single component in the shape of a conventional SIM card, but it will be appreciated that SIM 1364 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1364 and another device, which may be a component of RAN 105 or core network 130 shown in FIG. 1). A SIM profile 1364 may also comprise identifying information that is unique to the SIM, or SIM profile, such as, for example, an International Mobile Subscriber Identity ("IMS") or information that may make up an IMSI.

SIM 1364 is shown coupled to both the first processor portion 1330 and the second processor portion 1332. Such an implementation may provide an advantage that first processor portion 30 may not need to request or receive information or data from SIM 1364 that second processor 1332 may request, thus eliminating the use of the first processor acting as a 'go-between' when the second processor uses information from the SIM in performing its functions and in executing applications. First processor 1330, which may be a modem processor or baseband processor, is shown smaller than processor 1332, which may be a more sophisticated application processor, to visually indicate the relative levels of sophistication (i.e., processing capability and performance) and corresponding relative levels of operating power consumption levels between the two processor portions. Keeping the second processor portion 1332 asleep/inactive/in a low power state when UE 1360 does not need it for executing applications and processing data related to an application provides an advantage of reducing power consumption when the UE only needs to use the first processor portion 1330 while in listening mode for monitoring routine configured bearer management and mobility management/maintenance procedures, or for monitoring search spaces that the UE has been configured to monitor while the second processor portion remains inactive/asleep.

UE 1360 may also include sensors 1366, such as, for example, temperature sensors, accelerometers, gyroscopes, barometers, moisture sensors, and the like that may provide signals to the first processor 1330 or second processor 1332. Output devices 1368 may comprise, for example, one or more visual displays (e.g., computer monitors, VR appliances, and the like), acoustic transducers, such as speakers or microphones, vibration components, and the like. Output devices 1368 may comprise software that interfaces with output devices, for example, visual displays, speakers, microphones, touch sensation devices, smell or taste devices, and the like, that are external to UE 1360.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |

TABLE 1-continued

| Term | Definition |
| --- | --- |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   based on a second priority corresponding to a second quality-of-service associated with a second user equipment being determined to be higher than a first priority corresponding to a first quality-of-service associated with a first user equipment, determining, by a radio access network node comprising at least one processor, to grant a data channel resource to the second user equipment; and
   transmitting, in a first control channel search space preemption candidate according to a second scrambling code that is usable by the second user equipment to decode the first channel search space preemption candidate, scheduling information corresponding to the grant of the data channel resource to the second user equipment,
   wherein the first user equipment is configured to decode the first control channel search space preemption candidate according to a first scrambling code that corresponds to the first user equipment, and wherein the second scrambling code is not usable by the first user equipment to decode the first control channel search space preemption candidate.

2. The method of claim 1, further comprising:
   configuring the first user equipment to monitor the first control channel search space preemption candidate according to a first scrambling code corresponding to the first user equipment;
   configuring the second user equipment to monitor the first control channel search space preemption candidate according to the second scrambling code corresponding to the second user equipment; and
   scrambling the first control channel search space preemption candidate according to the second scrambling code;

wherein the first control channel search space preemption candidate is associated with the first user equipment.

3. The method of claim 1, further comprising:

wherein the first user equipment is configured to monitor the first control channel search space preemption candidate according to the first scrambling code, configuring the first user equipment and the second user equipment to monitor a control channel preemption search space that comprises a first preemption indication of the first control channel search space preemption candidate, wherein the control channel preemption search space further comprises preemption information; and configuring, with the preemption information, the second user equipment to monitor the first control channel search space preemption candidate according to the second scrambling code.

4. The method of claim 3, wherein the preemption information comprises information indicating that the first control channel search space preemption candidate has been granted to the second user equipment.

5. The method of claim 4, wherein the preemption information comprises one or more of: an identifier of the first user equipment, an identifier of the second user equipment, a preemption validity period during which the first control channel search space preemption candidate is available for monitoring, timing and frequency resource information corresponding to the first control channel search space preemption candidate, a bandwidth portion identifier corresponding to the first control channel search space preemption candidate, a bandwidth index corresponding to the first control channel search space preemption candidate, a search space identifier corresponding to the first control channel search space preemption candidate, a search space index corresponding to the first control channel search space preemption candidate, an aggregation level, a modulation scheme corresponding to the first control channel search space preemption candidate, a coding scheme corresponding to the first control channel search space preemption candidate, the first scrambling code corresponding to the first control channel search space preemption candidate, or a scrambling sequence corresponding to the first control channel search space preemption candidate.

6. The method of claim 3, further comprising configuring the first user equipment to monitor the first control channel search space preemption candidate after a defined preemption validity period that begins in association with the configuring of the second user equipment to monitor the first control channel search space preemption candidate according to the second scrambling code.

7. The method of claim 3, wherein the control channel preemption search space comprises complementary configuration information to configure the first user equipment to use a complementary control channel search space that occurs before an occurrence of a next first-user-equipment-specific control channel search space corresponding to a configured discontinuous reception cycle of the first user equipment.

8. The method of claim 1, further comprising configuring the second user equipment to monitor a second control channel search space, that is different than the first control channel search space preemption candidate, according to a third scrambling code that is specific to the second user equipment.

9. A method, comprising:

receiving, in a first control channel search space preemption candidate, by a second user equipment that comprises at least one processor, scheduling information corresponding to a grant of a data channel resource to the second user equipment;

decoding, by the second user equipment, the first control channel search space candidate according to a second scrambling code; and receiving, by the second user equipment, data traffic via the data channel resource, wherein a first user equipment is configured to decode the first control channel search space preemption candidate according to a first scrambling code that corresponds to the first user equipment, and wherein the second scrambling code is not usable by the first user equipment to decode the first control channel search space preemption candidate.

10. The method of claim 9, wherein the second user equipment is configured to monitor the first control channel search space preemption candidate according to the second scrambling code corresponding to the second user equipment.

11. The method of claim 9, wherein the first user equipment and the second user equipment are configured to monitor a control channel preemption search space that comprises a first preemption indication of the first control channel search space preemption candidate, wherein the control channel preemption search space further comprises preemption information, and further comprising configuring, with the preemption information, the second user equipment to monitor the first control channel search space preemption candidate according to the second scrambling code corresponding to the second user equipment.

12. The method of claim 11, wherein the second user equipment is configured with the preemption notification information to monitor a second control channel search space preemption candidate according to the second scrambling code.

13. The method of claim 9, wherein the first user equipment and the second user equipment are configured to monitor a control channel preemption search space that comprises a first preemption indication of the first control channel search space preemption candidate, wherein the control channel preemption search space further comprises preemption information, and further comprising configuring, with the preemption information, the second user equipment to monitor the first control channel search space preemption candidate according to a common scrambling code corresponding to the first user equipment and to the second user equipment.

14. The method of claim 11, wherein the second user equipment is configured to monitor the first control channel search space preemption candidate during a configured preemption validity period.

15. A non-transitory machine-readable medium, comprising executable instructions that, when executed by at least one processor of a second mobile device that is coupled with a communication network, facilitate performance of operations, comprising:

receiving, in a first control channel search space preemption candidate, scheduling information corresponding to a grant of a data channel resource to the second mobile device;

decoding, by the second mobile device, the first control channel search space candidate according to a second scrambling code; and receiving data traffic having the second quality of service via the data channel resource, wherein a first mobile device is configured to decode the first control channel search space preemption candidate according to a first scrambling code that corresponds to the first mobile device, and wherein the second scrambling code is not usable by the first mobile device to decode the first control channel search space preemption candidate.

16. The non-transitory machine-readable medium of claim 15, wherein the second mobile device is configured to monitor the first control channel search space preemption candidate according to the second scrambling code that corresponds to the second mobile device.

17. The non-transitory machine-readable medium of claim 15, wherein the operations further comprise:
configuring the second mobile device to monitor a control channel preemption search space that comprises a first preemption indication of the first control channel search space preemption candidate, wherein the control channel preemption search space further comprises preemption information; and
configuring, with the preemption information, the second mobile device to monitor the first control channel search space preemption candidate according to the second scrambling code that corresponds to the second mobile device.

18. The non-transitory machine-readable medium of claim 15, wherein the operations further comprise:
configuring the second mobile device to monitor a control channel preemption search space that comprises a first preemption indication of the first control channel search space preemption candidate, wherein the control channel preemption search space further comprises preemption information; and
configuring, with the preemption information, the second mobile device to monitor the first control channel search space preemption candidate according to a third scrambling code that corresponds to the second mobile device and to at least one other mobile device.

19. The non-transitory machine-readable medium of claim 17, wherein the preemption information comprises information indicating that the first control channel search space candidate has been granted to the second mobile device.

20. The non-transitory machine-readable medium of claim 17, wherein the second mobile device is configured to monitor the first control channel search space preemption candidate during a configurable preemption validity period.

* * * * *